(12) United States Patent
Toyoguchi

(10) Patent No.: US 6,620,481 B2
(45) Date of Patent: Sep. 16, 2003

(54) MAGNETIC RECORDING MEDIUM, MAGNETIC RECORDING MEDIUM MANUFACTURE METHOD, AND INFORMATION REGENERATION APPARATUS

(75) Inventor: Takashi Toyoguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 09/782,209

(22) Filed: Feb. 13, 2001

(65) Prior Publication Data

US 2002/0004149 A1 Jan. 10, 2002

(30) Foreign Application Priority Data

Jul. 6, 2000 (JP) ........................................ 2000-205088

(51) Int. Cl.$^7$ ................................................. G11B 5/82
(52) U.S. Cl. .................. 428/65.5; 428/695 TC; 428/694 TF; 428/694 TP; 360/35
(58) Field of Search ..................... 428/65.5, 694 TC, 428/694 TF, 694 TP; 360/135

(56) References Cited

U.S. PATENT DOCUMENTS 4,721,640 A * 1/1988 Kato et al. ................. 428/65.4
4,835,070 A * 5/1989 Kurokawa et al. .......... 428/65.5
5,650,900 A * 7/1997 Wei et al. ................... 360/135
5,822,163 A * 10/1998 Lee et al. .................... 360/135
6,403,194 B1 * 6/2002 Ono et al. ................... 428/65.5

FOREIGN PATENT DOCUMENTS

| JP | 1-205714 | 8/1989 |
| JP | 4-106722 | 4/1992 |
| JP | 4-114317 | 4/1992 |
| JP | 11-175960 | 7/1999 |

* cited by examiner

Primary Examiner—Stevan A. Resan
(74) Attorney, Agent, or Firm—Greer, Burns & Crain, Ltd.

(57) ABSTRACT

There is disclosed a magnetic recording medium in which reduced magnetic spacing and secured contact sliding durability are compatible with each other, and the magnetic recording medium includes: a disk-like substrate 1; an underlayer 2 formed on the substrate; a magnetic layer 3 formed on the underlayer, including a ferromagnetic material, and formed by introducing a predetermined element to modify a surface layer portion; and a protective layer 4—1, formed in at least one area of an outer peripheral area and an inner peripheral area excluding a middle area held between the outer peripheral area and the inner peripheral area of a disk on the modified surface layer portion of the magnetic layer, for protecting the magnetic layer.

4 Claims, 7 Drawing Sheets

MAGNETIC RECORDING MEDIUM, MAGNETIC RECORDING MEDIUM MANUFACTURE METHOD, AND INFORMATION REGENERATION APPARATUS

BACKGROUND OF THE INVENTION i) Field of the Invention

The present invention relates to a magnetic recording medium in which information is magnetically recorded, a method of manufacturing the magnetic recording medium, and an information regeneration apparatus for regenerating the information recorded in the magnetic recording medium.

ii) Description of Related Art

In recent years, with spread of computers, a large amount of information has been handled in a daily manner, and as one of apparatuses for recording/regenerating a large amount of information, a hard disk drive (HDD) has been used.

The HDD incorporates a magnetic disk as a disk-like magnetic recording medium in which the information is recorded, and a magnetic head for recording/regenerating the information in the magnetic disk.

FIG. 1 is a diagram showing a positional relation between the magnetic recording medium and the magnetic head in the HDD.

FIG. 1 shows a magnetic disk 20, and a head slider 30 floated from the magnetic disk 20 and provided with a magnetic head 31 in the vicinity of an end thereof.

In the magnetic disk 20, an underlayer 12 constituted of Cr, and the like is formed on a nonmagnetic substrate 11, and a magnetic layer 13 of a material indicating ferromagnetism is formed on the underlayer 12. The magnetic layer 13 is divided into a plurality of micro areas, and carries information in accordance with magnetization directions in the respective micro areas. Moreover, the magnetic layer 13 is covered and protected by a protective layer 14 formed of carbon and the like and a lubricating layer 15 of perfluoropolyether (PFPE) and the like. During operation of HDD, the magnetic disk 20 is in a rotating state.

For the head slider 30, a floating surface facing the magnetic disk 20 is covered and protected by a protective film 32, for example, of carbon. The head slider 30 and the magnetic head 31 included in the head slider 30 are disposed in the vicinity of the magnetic disk 20, and during starting/stopping of rotation of the magnetic disk, the floating surface contacts the surface of the magnetic disk 20 to slide thereon, but during operation, as shown in FIG. 1, a floating state above the rotating magnetic disk 20 is obtained.

The magnetic head 31 generates a magnetic field in accordance with a signal current from the outside, appropriately reverses each magnetization of each micro area of the magnetic disk to record information, and reads the respective magnetization directions of the magnetic disk 20 to regenerate the information.

A recording density of the information recorded in the magnetic disk is enhanced every year, and a magnetic disk in which recording with a higher recording density is possible has been demanded. As one factor necessary for enhancing the recording density, as shown by an arrow in FIG. 1, a distance (magnetic spacing) between the magnetic layer 13 of the magnetic disk and the magnetic head 31 is reduced. In recent years, the magnetic spacing of about 50 nm has been realized, but in order to enhance the recording density, the magnetic spacing needs to further be reduced.

The reduction of the magnetic spacing is realized, for example, by thinning the protective layer 14. In recent years, in order to reduce the magnetic spacing, the protective layer of the magnetic disk is formed with a very thin film having thickness of about a dozen or so nanometers over the entire surface of the disk, but to further reduce the magnetic spacing, it has been requested to set the thickness of the protective layer to 10 nm or less.

However, when the protective layer with a thickness of 10 nm or less is formed, for example, using an amorphous carbon based material by a sputtering process, the formed protective layer is insufficient in film hardness and surface coverage, cannot maintain stable friction/abrasion properties for a long period and is disadvantageously inferior in contact sliding durability. Moreover, in a case in which the protective layer with a thickness of 10 nm or less is formed using the amorphous carbon based material by a plasma CVD process which is known to form the film with higher hardness and higher coverage rate than those of the sputtering process, in a thin film area of several nanometers, in spite of the high hardness of the protective layer itself, the hardness of the underlying magnetic layer influences a surface hardness, as a result the hardness of the medium surface is reduced, and there still occurs a problem that the contact sliding durability is deteriorated.

SUMMARY OF THE INVENTION

The present invention has been developed in consideration of the aforementioned circumstances, and an object thereof is to provide a magnetic recording medium in which reduction of a magnetic spacing and securing of a contact sliding durability are compatible with each other, a magnetic recording medium manufacture method, and an information regeneration apparatus.

To achieve the aforementioned object according to the present invention there is provided a first magnetic recording medium comprising:

a disk-like substrate;

a magnetic layer consisting of a material indicating ferromagnetism, said magnetic layer being formed on said substrate; and a protective layer for protecting the magnetic layer, said protective layer being formed in at least one area of an outer peripheral area and an inner peripheral area of a disk excluding a middle area held between the outer peripheral area and the inner peripheral area on said magnetic layer.

The first magnetic recording medium of the present invention is employed, for example, in HDD, the protective layer is disposed only in areas such as the outer peripheral area or inner peripheral area which is brought into contact with a magnetic head in the HDD in a CSS or Load/Unload state, and the protective layer can be provided with a film thickness equal to a conventional film thickness as occasion demands. Therefore, in the first magnetic recording medium of the present invention, contact sliding durability is secured against the magnetic head. Moreover, for the first magnetic recording medium of the present invention, since no protective layer is formed in the middle area or another area with information recorded therein, the magnetic spacing can be reduced by the area with no protective layer formed therein. As described above, in the first magnetic recording medium of the present invention, the reduced magnetic spacing and the contact sliding durability are compatible with each other.

To achieve the aforementioned object according to the present invention there is provided a second magnetic recording medium comprising:

a disk-like substrate;

a magnetic layer consisting of a material indicating ferromagnetism, wherein a surface layer portion is modified by introducing a predetermined element, said magnetic layer being formed on said substrate; and a protective layer for protecting the magnetic layer, said protective layer being formed in at least one area of an outer peripheral area and an inner peripheral area of a disk excluding a middle area held between the outer peripheral area and the inner peripheral area on the modified surface layer portion of said magnetic layer.

Similarly as the first magnetic recording medium of the present invention, the second magnetic recording medium of the present invention is employed, for example, in the HDD, the protective layer is disposed only in the areas such as the outer peripheral area or inner peripheral area which is brought into contact with the magnetic head in the HDD in the CSS or Load/Unload state, and the protective layer can be provided with the film thickness equal to the conventional film thickness as occasion demands. Therefore, in the second magnetic recording medium of the present invention, the contact sliding durability is secured against the magnetic head. Moreover, for the second magnetic recording medium of the present invention, no protective layer is formed in the middle area or another area with information recorded therein, and the magnetic layer is protected by setting the surface layer portion of the magnetic layer to be thinner than the protective layer and uniformly modifying the surface layer portion. Therefore, in the second magnetic recording medium of the present invention, the magnetic spacing can be reduced by the area with no protective layer formed therein. Moreover, since the surface layer portion of the magnetic layer is modified, protection of the magnetic layer can more firmly be performed. As described above, in the magnetic recording medium of the present invention, the reduced magnetic spacing and the contact sliding durability are compatible with each other.

For the second magnetic recording medium of the present invention, in the magnetic layer, the surface layer portion is preferably modified by introducing at least one element selected from an element group consisting of nitrogen, oxygen, and fluorine.

Since nitrogen and oxygen are introduced to the surface layer portion of the magnetic layer, for the surface layer portion, hardness is raised, and insulation properties are enhanced. Moreover, since fluorine is introduced to the surface layer portion of the magnetic layer, for the surface layer portion, the hardness is raised, and friction coefficient is reduced. Moreover, to secure the insulation properties of the magnetic recording medium surface and further reduce the friction coefficient, the lubricating layer including fluorine is sometimes formed on the magnetic layer, and by introducing fluorine to the surface layer portion of the magnetic layer, the lubricating film is satisfactorily held on the magnetic layer.

For the first and second magnetic recording mediums of the present invention, the protective layer is preferably consisting of an amorphous carbon based material.

The protective layer of the material is high in hardness and superior in durability against sliding with the magnetic head or the like.

Moreover, the first and second magnetic recording mediums of the present invention are preferably provided with a lubricating layer formed on the magnetic layer and protective layer, said lubricating layer consisting of a fluorine based lubricant.

By the presence of the lubricating layer, the friction coefficient between the head and the magnetic recording medium is reduced, and sliding durability of the magnetic recording medium is enhanced. Moreover, the insulation properties of the magnetic recording medium are also secured.

Furthermore, in the first and second magnetic recording mediums of the present invention, the protective layer is preferably consisting of a carbon film to which at least one element selected from an element group consisting of hydrogen, nitrogen, and fluorine is introduced.

By introducing hydrogen, nitrogen and fluorine to the protective layer, abrasion resistance of the protective layer is enhanced. Moreover, when fluorine is introduced to the protective layer, and the lubricating layer is formed on the protective layer, adhesion properties of the lubricating layer and protective layer are enhanced.

For the first and second magnetic recording mediums of the present invention, the protective layer is preferably consisting of a carbon film to which hydrogen is introduced in such a manner that a C—H bond content is $15 \times 10^{21}/cm^3$ or less.

With the C—H bond content, the protective layer is provided with a sufficient sliding durability as described later in an embodiment.

To achieve the aforementioned object according to the present invention there is provided a first magnetic recording medium manufacture method comprising:

a magnetic layer forming step of forming a magnetic layer including a ferromagnetic material on a disk-like substrate; and a protective layer forming step of forming a protective layer for protecting the magnetic layer in at least one area of an outer peripheral area and an inner peripheral area of a disk excluding a middle area held between the outer peripheral area and the inner peripheral area on the magnetic layer formed in the magnetic layer forming step.

According to the first magnetic recording medium manufacture method of the present invention, similarly as the first magnetic recording medium of the present invention, a magnetic recording medium is manufactured in which the reduced magnetic spacing and the contact sliding durability are compatible with each other.

To achieve the aforementioned object according to the present invention there is provided a second magnetic recording medium manufacture method comprising:

a magnetic layer forming step of forming a magnetic layer consisting of a material indicating ferromagnetism on a disk-like substrate;

a modifying step of introducing a predetermined element onto the magnetic layer formed by said magnetic layer forming step to modify a surface layer portion of the magnetic layer; and a protective layer forming step of forming a protective layer for protecting the magnetic layer in at least one area of an outer peripheral area and an inner peripheral area of a disk excluding a middle area held between the outer peripheral area and the inner peripheral area on the surface layer portion of the magnetic layer modified by said modifying step.

According to the second magnetic recording medium manufacture method of the present invention, similarly as the second magnetic recording medium of the present invention, the magnetic recording medium is manufactured in which the reduced magnetic spacing and the contact sliding durability are compatible with each other.

In the second magnetic recording medium manufacture method of the present invention, the modifying step preferably comprises subjecting the surface layer portion of the magnetic layer formed by the magnetic layer forming step to at least one treatment of a nitrogen plasma treatment, an oxygen plasma treatment, and a $CF_4$ plasma treatment to modify the surface layer portion.

By the nitrogen plasma treatment or the oxygen plasma treatment, for the surface layer portion of the magnetic layer, the hardness is raised, and the insulation properties are enhanced. Moreover, by the $CF_4$ plasma treatment, for the surface layer portion of the magnetic layer, the hardness is raised, and the friction coefficient is reduced. Furthermore, when the lubricating layer of the fluorine-based lubricant is formed on the magnetic layer, the lubricating film is satisfactorily held.

Moreover, in the first and second magnetic recording medium manufacture methods of the present invention, the protective layer forming step preferably comprises forming a hydrocarbon based gas or a mixture gas of a hydrocarbon based gas and a predetermined additive gas into a plasma by a plasma CVD process to form the protective layer.

By the protective layer forming step, even with a film thickness of 10 nm or less, the protective layer is consisting of a dense and hard film.

For magnetic recording apparatuses of the present invention for achieving the aforementioned object, either one of first and second information recording apparatuses is an information recording apparatus for applying a magnetic field to a magnetic recording medium which carries magnetization and reversing a magnetization direction to record information on the magnetic recording medium.

In the first information recording apparatus, the magnetic recording medium comprises the first magnetic recording medium of the present invention.

In the second information recording apparatus, the magnetic recording medium comprises the second magnetic recording medium of the present invention.

In these first and second information recording apparatuses of the present invention, as the respective magnetic recording mediums disposed on the information recording apparatuses, the first, second magnetic recording mediums in which the reduced magnetic spacing and the contact sliding durability are compatible with each other are employed, and either one of the apparatuses is therefore suitable for recording the information with a high recording density.

For information regeneration apparatuses of the present invention for achieving the aforementioned object, either one of first and second information regeneration apparatuses is an information regeneration apparatus having a magnetic recording medium in which information is recorded in accordance with a magnetization direction, and a magnetic head, disposed in the vicinity of the magnetic recording medium, for detecting magnetization directions of respective points of the magnetic recording medium said information regeneration apparatus regenerating the information in accordance with the magnetization directions of the respective points of the magnetic recording medium detected by the magnetic head.

For the first information regeneration apparatus, the magnetic recording medium comprises the first magnetic recording medium of the present invention.

For the second information regeneration apparatus, the magnetic recording medium comprises the second magnetic recording medium of the present invention.

In these first and second information regeneration apparatuses of the present invention, as the respective magnetic recording mediums disposed on the information regeneration apparatuses, the first, second magnetic recording mediums in which the reduced magnetic spacing and the contact sliding durability are compatible with each other are employed, and either one of the apparatuses is therefore suitable for regenerating the information recorded with the high recording density.

DETAILED DESCRIPTION OF THE PREFERRED EMBODIMENTS

An embodiment of the present invention will be described hereinafter.

Figure 2:
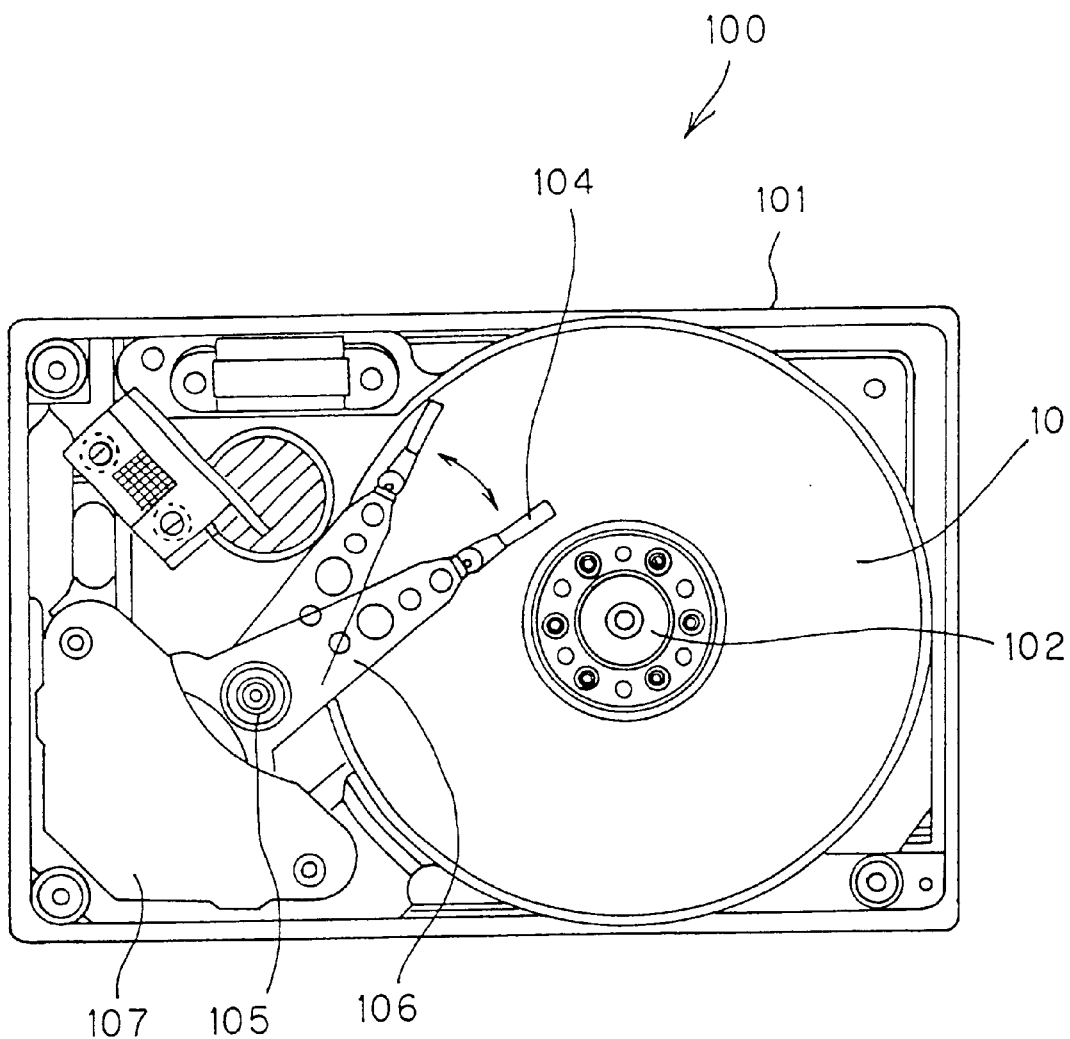
FIG. 2 is a schematic view of a hard disk drive of the present embodiment.

FIG. 2 is a schematic view of a hard disk drive of the present embodiment.

A hard disk drive (HDD) 100 shown in FIG. 2 corresponds to an information recording apparatus and information regeneration apparatus of the present invention. A housing 101 of the HDD 100 shown in FIG. 2 contains: a rotation shaft 102; a magnetic disk 10 which is attached to the rotation shaft 102, rotates centering on the rotation shaft 102 during operation of the HDD 100, and corresponds to a magnetic recording medium of the present invention; a floating head slider 104 disposed in the vicinity of and opposite to the surface of the magnetic disk 10; an arm shaft 105; a carriage arm 106 which is provided with the floating head slider 104 fixed to a tip end and horizontally moves on the magnetic disk 10 centering on the arm shaft 105; and an actuator 107 for driving the horizontal movement of the carriage arm 106.

Figure 1:
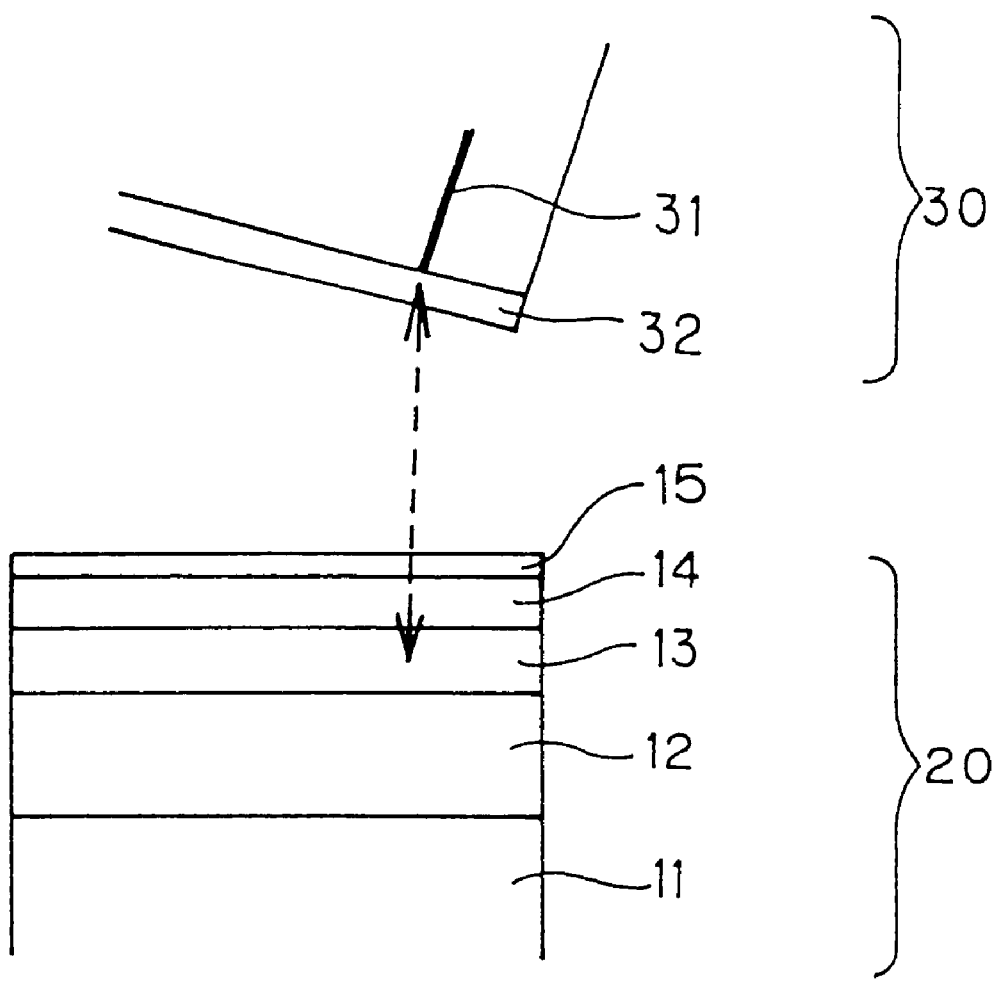
FIG. 1 is a view showing a positional relation between a magnetic recording medium and a magnetic head in HDD.

In the HDD 100, recording of information on the magnetic disk 10, and regenerating of the information recorded in the magnetic disk 10 are performed. During the recording and regeneration of the information, first the actuator 107 constituted of a magnetic circuit drives the carriage arm 106, and the floating head slider 104 is positioned in a desired track on the rotating magnetic disk 10. On the tip end of the floating head slider 104, a magnetic head of the present embodiment not shown in FIG. 1 is disposed. With rotation of the magnetic disk 10, the magnetic head successively approaches respective micro areas arranged in respective tracks of the magnetic disk 10. During information recording, an electric recording signal is inputted to the magnetic head, and the magnetic head applies a magnetic field to each micro area in response to the inputted recording signal to record the information carried by the recording signal in the form of a magnetization direction of each micro area. Moreover, during information regeneration, the magnetic head generates an electric regeneration signal in accordance with the magnetic field generated from each magnetization to extract the information recorded in the form of the magnetization direction of each micro area. An inner space of the housing 101 is closed by a cover (not shown).

In general, in the HDD, there are a contact start stop (CSS) system in which the magnetic head floats from the magnetic disk during rotation start of the magnetic disk, and contacts a predetermined inner peripheral area of a magnetic disk surface during rotation stop of the magnetic disk, and a load/unload (L/UL or ramp load) system in which a ramp for temporarily holding the magnetic head is disposed outside the magnetic disk, and the magnetic head is loaded onto the rotating magnetic disk 10 from the ramp. The HDD 100 of the present embodiment may be of either system. In the CSS system, during the rotation start and stop of the magnetic disk, contact sliding of the magnetic disk 10 and magnetic head occurs in a so-called CSS zone which is the inner peripheral area on the magnetic disk 10, and in the L/UL system, during loading/unloading of the magnetic head with respect to the ramp, the contact sliding of the magnetic disk 10 and magnetic head occurs in a so-called L/UL zone which is an outer peripheral area.

The magnetic disk 10 of the present embodiment will next be described.

Figure 3:
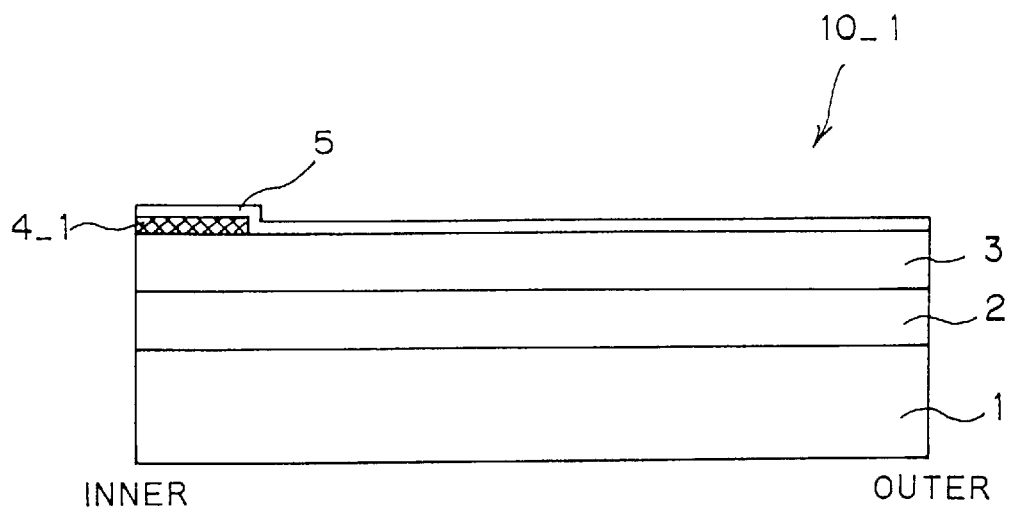
FIG. 3 is a diagram showing one example of a sectional structure of a first magnetic disk which constitutes the hard disk drive of FIG. 2 in the present embodiment.
Figure 4:
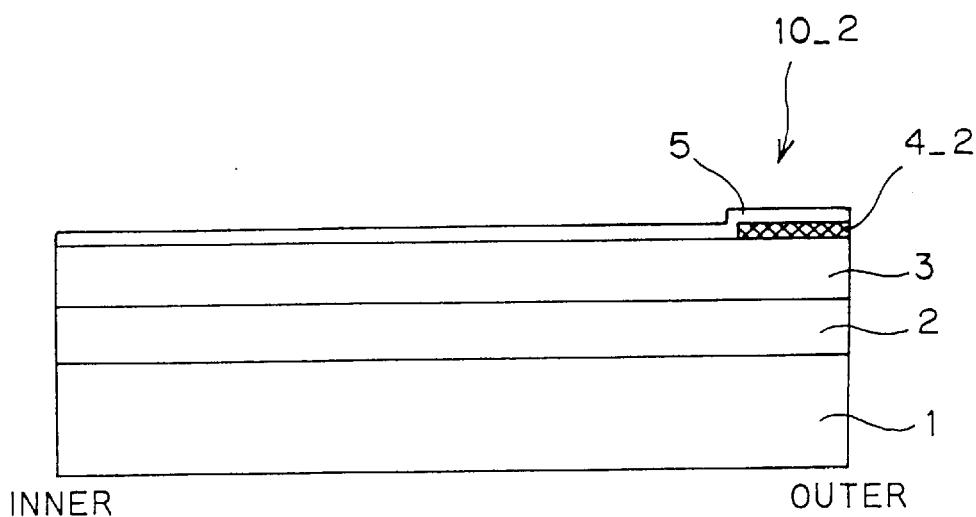
FIG. 4 is a diagram showing one example of the sectional structure of a second magnetic disk which constitutes the hard disk drive of FIG. 2 in the present embodiment.

FIG. 3 is a diagram showing one example of a sectional structure of a first magnetic disk which constitutes the hard disk drive of FIG. 2 in the present embodiment, and FIG. 4 is a diagram showing one example of the sectional structure of a second magnetic disk which constitutes the hard disk drive of FIG. 2 in the present embodiment.

A first magnetic disk 10_1 of the present embodiment shown in FIG. 3 is a magnetic disk employed in the HDD 100 of the CSS system, and a second magnetic disk 10_2 of the present embodiment shown in FIG. 4 is a magnetic disk employed in the HDD 100 of the L/UL system.

The first magnetic disk 10_1 includes: a substrate 1; an underlayer 2 formed on the substrate 1; a magnetic layer 3 formed on the underlayer 2; a protective layer 4_1 formed in the inner peripheral area of the disk on the magnetic layer 3; and a lubricating layer 5 formed on an area of the magnetic layer 3 in which the protective layer 4_1 fails to be formed and on the protective layer 4_1.

The second magnetic disk 10_2 is provided with substantially the same structure as that of the first magnetic disk 10_1, but is different in that instead of the protective layer 4_1 formed in the inner peripheral area of the disk, a protective layer 4_2 is formed in the outer peripheral area of the disk on the magnetic layer 3, and the lubricating layer 5 is formed on the area of the magnetic layer 3 in which the protective layer 4_2 fails to be formed and on the protective layer 4_2.

The first and second magnetic disks of the present embodiment are characterized in that the protective layer 4_1, 4_2 is formed only in some areas of the disk such as the inner peripheral area and outer peripheral area.

Respective layers constituting the first and second magnetic disks of the present embodiment will be described hereinafter.

The substrate 1 is consisting of a nonmagnetic disk, for example, an NiP-plated aluminum disk.

The underlayer 2 is formed on an NiP-plated film of the substrate 1, serves as a base layer of the magnetic layer 3, and is consisting of a material including at least one of a nonmagnetic material and an antiferromagnetic material. The underlayer 2 is consisting, for example, of a 30 nm thick Cr film. Additionally, except Cr, as the material constituting the underlayer 2, there are a CrMo alloy, a CrMoW alloy, and the like.

For the magnetic layer 3, a multilayered film consisting of a recording layer 3_1 and a modified layer 3_2 will be described later, but the magnetic layer 3 constituting the first or second magnetic disk of the present embodiment is constituted of a single-layer film corresponding to the recording layer 3_1.

The magnetic layer 3, that is, the recording layer 3_1 is formed on the underlayer 2, includes a ferromagnetic material and indicates ferromagnetism. Recording information is held in the magnetic layer 3_1 as respective magnetization directions of respective micro areas of the recording layer 3_1. The recording layer 3_1 is consisting, for example, of a 18 nm thick CoCr alloy film. Additionally, except the CoCr alloy, examples of the material constituting the recording layer 3_1 include a CoCrTa alloy, a CoCrPtTa alloy, a CoCrPtTaB alloy, and the like. These Co alloys are hexagonal system alloys indicating ferromagnetism, and are provided with uniaxial crystal magnetic anisotropy. Since these Co alloys generate an appropriately high coercive force (of the order of 160 kA/m to 400 kA/m), magnetization in the recording layer 3_1 of the Co alloy is satisfactorily held.

The protective layers 4_1, 4_2 are formed on the modified layer 3_2 to protect the magnetic layer 3 from contact sliding with the magnetic head. The protective layer 4_1 constituting the first magnetic disk 10_1 is formed in the disk inner peripheral area (CSS zone). The protective layer 4_2 constituting the second magnetic disk 10_2 is formed in the disk outer peripheral area (L/UL zone). In the magnetic disk 10 of the present embodiment, among areas on the disk, information is recorded in the recording layer 3_1 in the area other than the CSS zone or the area other than the L/UL zone. The area other than the CSS zone or the area other than the L/UL zone will be hereinafter referred to as a recording zone. In the magnetic disk 10 of the present embodiment, since no information is recorded in these CSS zone and L/UL zone, and it is unnecessary to severely consider magnetic spacing reduction, the protective layer can be formed with a film thickness sufficient to be bearable against the contact sliding with the magnetic head as occasion demands.

The protective layers 4_1, 4_2 protect the magnetic layer 3, and are consisting, for example, of a 15 nm thick amorphous carbon based film. As the amorphous carbon based film, there is a carbon hydride film containing a hydrogen atom in the film, and the carbon hydride film is preferably superior in abrasion resistance.

As the amorphous carbon based film constituting the protective layer 4_1, 4_2, there are further a carbon nitride film containing a nitrogen atom in the film and a carbon fluoride film containing a fluorine atom. The carbon nitride film is superior in the abrasion resistance, and the carbon fluoride film is superior in the abrasion resistance and advantageously satisfactory in adhesion properties of the lubricating layer of a fluorine based lubricant described below.

The lubricating layer 5 is formed on a portion of the recording zone of the modified layer 3_2 and the protective layer 4_1 or 4_2, and reduces the friction coefficient of the magnetic head and magnetic disk 10. The lubricating layer 5 comprises, for example, a 1 to 2 nm thick fluorine based lubricating film. Examples of the material constituting the fluorine based lubricating film include fluorocarbon, PFPE, and the like. The lubricating layer 5 secures the insulation properties of the magnetic disk surface and further reduces the friction coefficient.

For the first and second magnetic disks of the present embodiment provided with the aforementioned layers, in the recording zone, only the lubricating layer 5 exists on the recording layer 3_1. However, since the recording zone usually fails to contact the magnetic head, the protective layer is not necessarily required.

The first or second magnetic disk of the present embodiment constituted of the aforementioned layers is provided with the protective layer 4_1 or 4_2 in the CSS zone, the L/UL zone or another area which is sometimes brought into contact with the magnetic head in a normal use state of the HDD 100, and the protective layer 4_1 or 4_2 can be provided with a film thickness equal to the conventional thickness. Therefore, in the first and second magnetic disks of the present embodiment, the contact sliding durability against the magnetic head is secured.

Moreover, in the first and second magnetic disks of the present embodiment, since no protective layer is formed in the recording zone with the information recorded therein, the magnetic spacing is reduced by the area with no protective layer formed therein.

As described above, in the first and second magnetic disks of the present embodiment, the reduced magnetic spacing and the contact sliding durability are compatible with each other.

Figure 5:
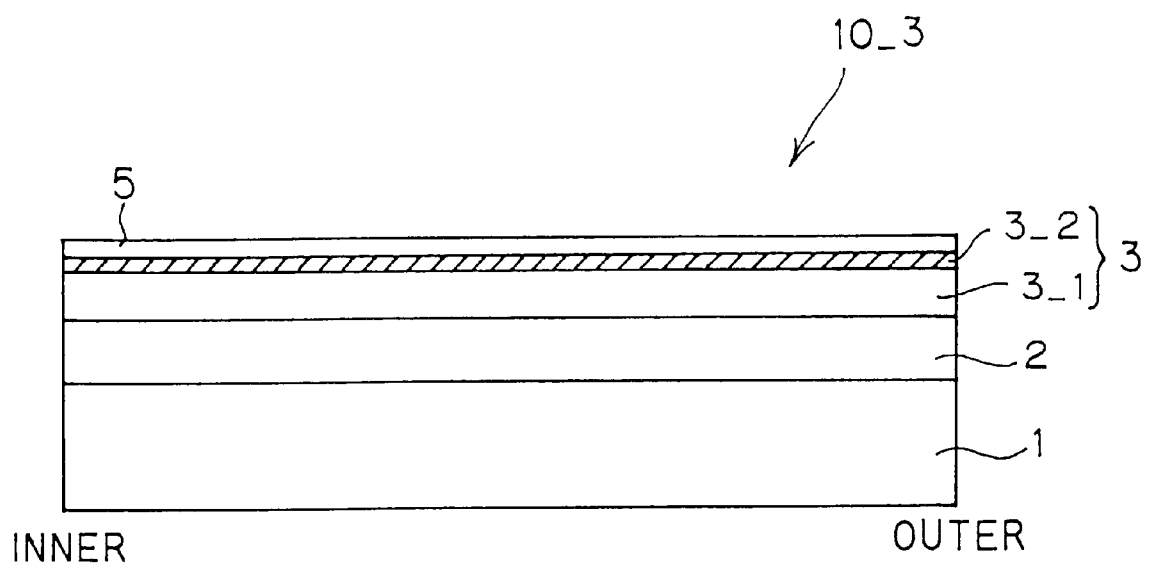
FIG. 5 is a diagram showing one example of the sectional structure of a third magnetic disk which constitutes the hard disk drive of FIG. 2 in the present embodiment.

FIG. 5 is a diagram showing one example of the sectional structure of a third magnetic disk which constitutes the hard disk drive of FIG. 2 in the present embodiment.

A third magnetic disk 10_3 of the present embodiment shown in FIG. 5 is a magnetic disk employed in either the HDD 100 of the CSS system or the HDD 100 of the L/UL system.

The third magnetic disk 10_3 includes: the substrate 1; the underlayer 2 formed on the substrate 1; the magnetic layer 3 constituted of the recording layer 3_1 formed on the underlayer 2 and the modified layer 3_2 formed on the recording layer 3_1; and the lubricating layer 5 formed on the magnetic layer 3.

The substrate 1, underlayer 2, and lubricating layer 5 constituting the third magnetic disk 10_3 are the same as the substrate 1, underlayer 2, and lubricating layer 5 constituting the aforementioned first or second magnetic disk. Moreover, the recording layer 3_1 constituting the magnetic layer 3 of the third magnetic disk 10_3 is the same as the recording layer 3_1 (magnetic layer 3) constituting the first or second magnetic disk.

The third magnetic disk 10_3 of the present embodiment is characterized by the modified layer 3_2 formed by introducing a predetermined element to modify the magnetic layer 3 as described later.

The modified layer 3_2 is a layer modified by introducing the predetermined element to a magnetic layer surface layer portion constituted by the same material as the material constituting the recording layer 3_1 by a plasma treatment as described later. The element to be introduced can appropriately be selected in accordance with properties to be applied to the magnetic layer 3, but is preferably, for example, at least one element of an element group consisting of nitrogen, oxygen, and fluorine.

For the modified layer 3_2, when nitrogen or oxygen is introduced to the material constituting the recording layer 3_1, as compared with the recording layer 3_1, hardness is raised and insulating properties are enhanced. Moreover, for the modified layer 3_2, when fluorine is introduced to the material constituting the recording layer 3_1, as compared with the recording layer 3_1, the hardness is raised, friction coefficient is reduced, and the fluorine based lubricating layer 5 is satisfactorily held. The modified layer 3_2 is, for example, 10 nm thick.

In the third magnetic disk 10_3 provided with the respective layers, instead of the conventional protective layer formed to protect the recording layer, for the surface layer portion of the magnetic layer 3, the modified layer 3_2 being thinner than the protective layer and uniformly modified protects the recording layer 3_1, so that the reduced magnetic spacing and the contact sliding durability are compatible with each other.

Figure 6:
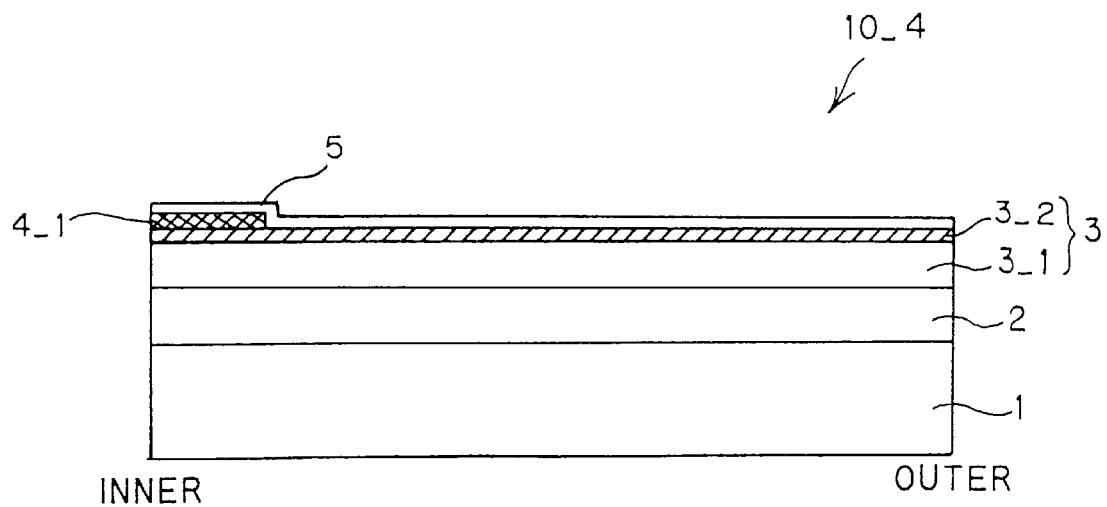
FIG. 6 is a diagram showing one example of the sectional structure of a fourth magnetic disk which constitutes the hard disk drive of FIG. 2 in the present embodiment.
Figure 7:
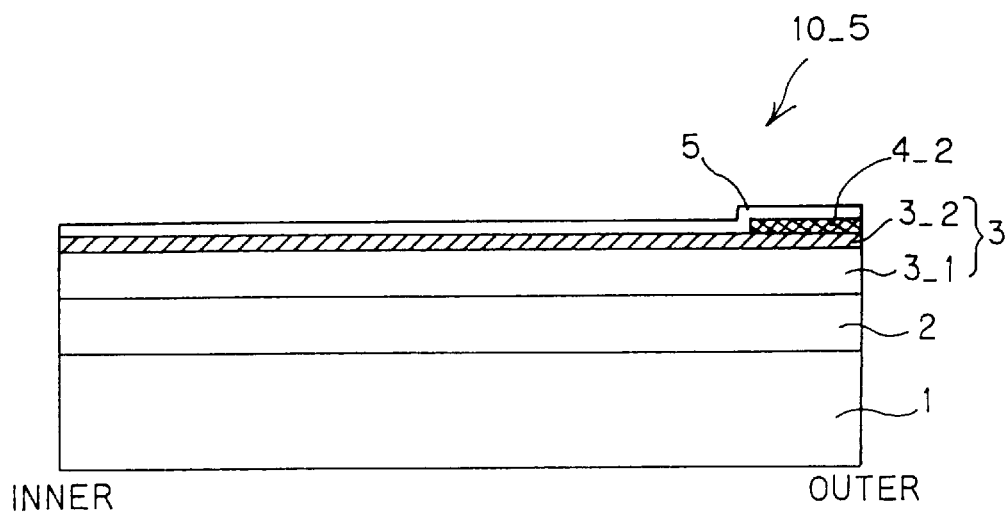
FIG. 7 is a diagram showing one example of the sectional structure of a fifth magnetic disk which constitutes the hard disk drive of FIG. 2 in the present embodiment.

FIG. 6 is a diagram showing one example of the sectional structure of a fourth magnetic disk which constitutes the hard disk drive of FIG. 2 in the present embodiment, and FIG. 7 is a diagram showing one example of the sectional structure of a fifth magnetic disk which constitutes the hard disk drive of FIG. 2 in the present embodiment.

A fourth magnetic disk 10_4 of the present embodiment shown in FIG. 6 is a magnetic disk employed in the HDD 100 of the CSS system, and a fifth magnetic disk 10_5 of the present embodiment shown in FIG. 7 is a magnetic disk employed in the HDD 100 of the L/UL system.

The fourth magnetic disk 10_4 is the same in the structure as the first magnetic disk 10_1, except that the magnetic layer 3 comprises the recording layer 3_1 and modified layer 3_2 similar to the third magnetic disk 10_3, and the fifth magnetic disk 10_5 is the same in the structure as the second magnetic disk 10_2, except that the magnetic layer 3 comprises the recording layer 3_1 and modified layer 3_2 similar to the third magnetic disk 10_3.

These fourth and fifth magnetic disks of the present embodiment are characterized in that the protective layer 4_1 or 4_2 is formed only in some areas of the disk such as the inner peripheral area and outer peripheral area, and the magnetic layer 3 includes the modified layer 3_2 modified by introducing the predetermined element.

The substrate 1, underlayer 2, the protective layer 4_1 or 4_2, and lubricating layer 5 constituting the fourth or fifth magnetic disk are the same as the substrate 1, underlayer 2, protective layer 4_1 or 4_2 and lubricating layer 5 constituting the aforementioned first or second magnetic disk. Moreover, the magnetic layer 3 constituting the fourth or fifth magnetic disk is the same as the magnetic layer 3 constituting the third magnetic disk. Additionally, for the magnetic layer 3 constituting the fourth and fifth magnetic disks, the modified layer 3_2 may be, for example, a thin layer with a thickness of 2 nm.

In the same manner as the first and second magnetic disks of the present embodiment, the fourth and fifth magnetic disks of the present embodiment are provided with the protective layers 4_1 and 4_2, no protective layer is formed in the recording zone in which the information is recorded, and the recording layer 3_1 is protected by the modified layer 3_2 which is thinner than the protective layer. Therefore, in the fourth and fifth magnetic disks of the present embodiment, the reduced magnetic spacing and the contact sliding durability are compatible with each other.

Additionally, in general, a thin protective layer is easily influenced by an underlayer hardness, and due to a low hardness of the underlayer, in spite of a high hardness of the protective layer itself, the hardness of the protective layer on the underlayer is also lowered. For the fourth or fifth magnetic disk of the present embodiment, since the protective layer 4_1 or 4_2 is formed on the modified and hardened modified layer 3_2, as compared with the protective layer directly formed on the recording layer 3_1, the hardness is enhanced, and the abrasion resistance is enhanced. Additionally, the effect of improving the abrasion resistance by the modification is reported in Tribology Conference Minutes 1999-11 of the Japan Tribology Society or the like.

Moreover, for the fourth and fifth magnetic disks of the present embodiment, different from the first and second magnetic disks, since the modified layer 3_2 exists on the recording layer 3_1, the magnetic layer 3 is more safely protected by the modified layer 3_2 even in the recording zone. One of roles of the modified layer 3_2 is corrosion prevention of the recording layer, and in order to provide the modified layer 3_2 with the role of corrosion prevention of the recording layer 3_1 in the recording zone, the thickness of the modified layer 3_2 may be in a range of 2 to 3 nm. In this manner, the modified layer 3_2 does not have to be formed to be very thick, and to prevent the thickness of the recording layer 3_1 from being unnecessarily reduced, the thickness is preferably 10% or less of the film thickness of the magnetic layer 3.

The respective layers constituting the aforementioned first to fifth magnetic disks are preferably provided with the illustrated thickness and consisting of the illustrated materials, but the thickness and materials are not necessarily limited as long as the respective layer functions fail to be deteriorated, and a multilayered structure may also be constituted. Moreover, the magnetic disk of the present invention may be provided with an intermediate layer mediating between the respective layers or an adhesive layer for enhancing adhesion of the respective layers.

A method of manufacturing the magnetic disk 10 of the present embodiment will next be described. Additionally, for comparison a method of manufacturing the conventional magnetic disk 20 will also be described.

Figure 8:
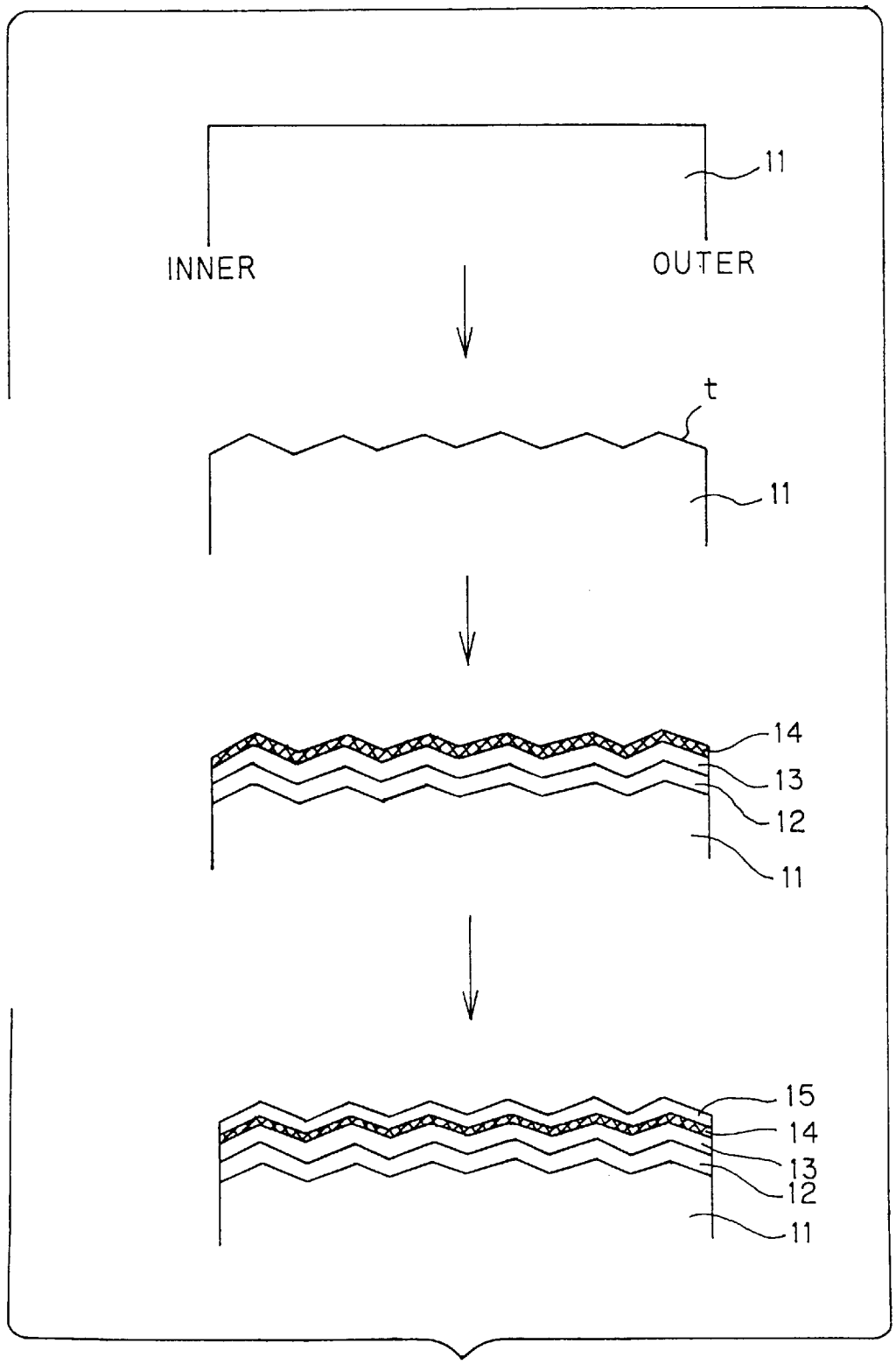
FIG. 8 is a diagram showing manufacture steps of a conventional magnetic disk.

FIG. 8 is a diagram showing manufacture steps of the conventional magnetic disk.

As shown in FIG. 8, in the manufacture of the conventional magnetic disk, first the substrate 11 of an NiP plated Al disk is prepared.

Subsequently, on the NiP plated film of the substrate 11, a micro unevenness t called a texture is formed, for example, by polishing the substrate 11 by an abrasive grind tape and subsequently performing cleaning by ultrapure water.

Subsequently, after forming the underlayer 12 of a 30 nm thick Cr film on the substrate 11 with the texture formed thereon, for example, by a magnetron sputtering process in an Ar gas atmosphere with a pressure of 0.7 Pa, at a substrate temperature of 150° C., and under other film formation conditions of common use, and forming the magnetic layer 13 of an 18 nm thick CoCr alloy film on the formed underlayer 12, the protective layer 14 of a 15 nm thick amorphous carbon hydride film is formed on the formed magnetic layer 13.

Finally, by dip-coating the formed protective layer 14 with fluorocarbon, and the like, the lubricating layer 15 is formed to complete the manufacture of the conventional magnetic disk 20.

Figure 9:
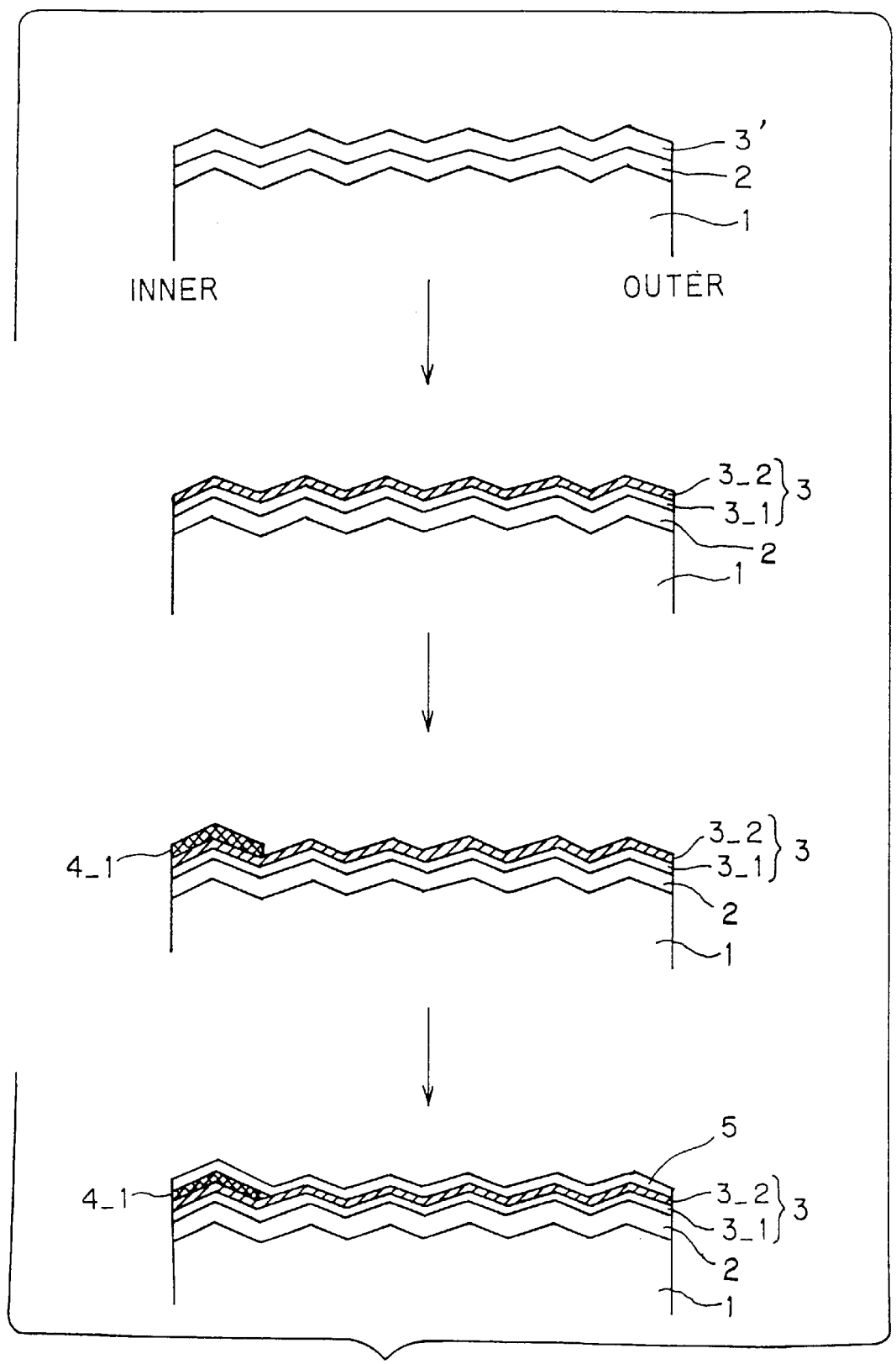
FIG. 9 is a diagram showing manufacture steps of the magnetic disk of the present embodiment.

FIG. 9 is a diagram showing manufacture steps of the magnetic disk of the present embodiment.

Here, by means of the fourth magnetic disk 10_4 and fifth magnetic disk 10_5 of the present embodiment constituted by the respective layers provided with the illustrated thickness and consisting of the illustrated materials as examples, the method of manufacturing the magnetic disk of the present embodiment will be described.

Additionally, since the first magnetic disk of the present embodiment is constituted by excluding the modified layer from the fourth magnetic disk 10_4, the disk is manufactured by manufacture steps constituted by excluding a step of forming the modified layer from the manufacture steps of the fourth magnetic disk 10_4 described later.

Moreover, since the second magnetic disk of the present embodiment is constituted by excluding the modified layer from the fifth magnetic disk 10_5, the disk is manufactured by the manufacture steps constituted by excluding the step of forming the modified layer from the manufacture steps of the fifth magnetic disk 10_5 described later.

Furthermore, since the third magnetic disk of the present embodiment is constituted, for example, by excluding the protective layer 4_1 from the fourth magnetic disk 10_4, the disk is manufactured by the manufacture steps constituted by excluding a step of forming the protective layer from the manufacture steps of the fourth magnetic disk 10_4. Additionally, the thickness of the modified layer or another layer needs to be appropriately adjusted.

Moreover, as not shown in FIG. 9, also in the manufacture steps of the fourth or fifth magnetic disk of the present embodiment, in the same manner as the manufacture steps of the conventional magnetic disk 20, after first preparing the substrate 1 of the NiP plated Al disk, the texture is formed on the NiP plated film of the substrate 1.

The subsequent steps are shown in FIG. 9. Additionally, FIG. 9 shows the manufacture steps of the fourth magnetic disk for the CSS system.

For example, in the same manner as the formation of the underlayer 12 and magnetic layer 13 in the conventional manufacture steps, on the substrate 1 with the texture formed thereon, the underlayer 2 of a 30 nm thick Cr film is formed, and a magnetic layer 3' of a 20 nm thick CoCr alloy film is formed on the formed underlayer 2.

Subsequently, by introducing the predetermined element to the magnetic layer 3' to modify the surface layer portion of the magnetic layer 3', the modified layer 3_2 is formed. As a method of forming the modified layer 3_2, ion beam irradiation by a nitrogen plasma is exemplified. By the ion beam irradiation by the nitrogen plasma, the modified layer 3_2 of CoCr alloy nitride is formed. The modified layer 3_2 may be formed by the ion beam irradiation not only by the nitrogen plasma but also by an oxygen plasma or a $CF_4$ plasma, or may be formed using a plurality of types of plasmas. By the ion beam irradiation by the oxygen plasma, the modified layer 3_2 of a CoCr alloy oxide is formed, and by the ion beam irradiation by the $CF_4$ plasma, the modified layer 3_2 of a CoCr alloy fluoride is formed. For the magnetic layer 3 with the modified layer 3_2 formed therein, a layer portion remaining without being modified corresponds to the recording layer 3_1.

The magnetic layer 3' is preferably modified basically by performing the plasma treatment. However, a plasma treatment method is not limited to the plasma ion beam irradiation. The modifying of the surface layer portion of the magnetic layer 3' may be performed by exposing the magnetic layer 3' to a high-frequency ion plasma, or by introducing nitrogen, oxygen, $CF_4$ gas or the like into a sputtering gas for the last several seconds in the sputtering step for forming the magnetic layer 3' and performing sputtering to carry out reaction. Additionally, plasma treatment conditions can appropriately be changed in accordance with the treatment method, the type of element to be introduced to the modified layer 3_2, or the thickness of the modified layer 3_2.

Subsequently, for example, the protective layer of amorphous carbon hydride is formed on the modified layer 3_2. As shown in FIG. 9, in the manufacture of the magnetic disk 10_4 for the CSS system, the protective layer 4_1 is formed in the inner peripheral area which corresponds to the CSS zone on the inner side of the disk. Moreover, as not shown, in the manufacture of the magnetic disk 10_5 for the L/UL system, the protective layer 4_2 is formed in the outer peripheral area which corresponds to the L/UL zone on the outer side of the disk.

For example, while the area other than the CSS zone or the area other than the L/UL zone is covered with a shield plate or the like, the protective layers 4_1, 4_2 can be formed by laminating the materials constituting the protective layer by the magnetron sputtering process, and the like. Alternatively, the protective layers 4_1, 4_2 can be formed in the CSS zone and L/UL zone by ion beam deposition with a reduced beam diameter or the like.

The protective layers 4_1, 4_2 can also be formed by the plasma CVD process. In a raw material gas of plasma CVD for forming the protective layers 4_1, 4_2 of amorphous carbon hydride, a hydrocarbon based gas, a mixture gas of hydrocarbon based gas and predetermined additive gas, or the like is used. Examples of the additive gas in the mixture gas include a hydrogen gas, an argon gas, a mixture gas of hydrogen and argon, and the like.

Since the plasma CVD process comprises forming a gas monomer molecule into a plasma for dissociation and causing re-bonding or the like in a gas phase or on the substrate for deposition, as compared with the sputtering process, coverage is satisfactory and a dense and hard film can be formed in spite that the film is very thin (10 nm or less). Since the protective layer is in contact with the magnetic head, a smooth surface, hardness, and long-period stable frictional properties need to be kept. Therefore, when the protective layer 4_1, 4_2 of an ultrathin film with a thickness of 10 nm or less is formed, the formation of the protective layer 4_1, 4_2 is preferably performed by the plasma CVD process.

Additionally, a C—H bond content in the carbon hydride film formed by the plasma CVD process is preferably $15 \times 10^{21}$ atoms/cm$^3$ or less. In this case, as disclosed in Japanese Patent Application Laid-Open No. 2000-105916, it has been found that the protective layer is provided with a sufficient sliding durability. For example, when an experiment was conducted by forming the protective layer of the carbon hydride film with a C—H bond content of $15 \times 10^{21}$ atoms/cm$^3$ and a film thickness of 8 nm on the substrate, rotating the protective layer, and pressing a pin provided with a diameter of 2 mm and consisting of $Al_2O_3$—TiC with a force of 0.1 N in a position where the protective layer rotates at a peripheral speed of 0.3 m/second, a revolution number until rupture of the protective film exceeded 1000 revolutions as a standard of the magnetic disk sliding durability. Moreover, when the C—H bond content of the protective layer was set to $15 \times 10^{21}$ atoms/cm$^3$ or less, the revolution number until the rupture further rose, and a further rise of the sliding durability was indicated.

Moreover, the protective layer 4_1, 4_2 may be consisting of a carbon nitride film or a carbon fluoride film, except the carbon hydride film. The carbon nitride film can be formed by mixing an $N_2$ gas into the sputtering gas for the sputtering process, or mixing the $N_2$ gas into a monomer gas for the plasma CVD process during film formation. Furthermore, the carbon fluoride film can be formed by similarly mixing the $CF_4$ gas into the sputtering gas or the monomer gas.

Finally, by dip-coating the formed protective layer and the modified layer 3_2 with no protective layer formed thereon with a fluorocarbon, PFPE or another fluorine based lubricating film lubricant, the lubricating layer 5 with a thickness of 1 to 2 nm is formed.

Thereby, the manufacture of the magnetic disk 10 by the magnetic disk manufacture method of the present embodiment is completed. In the manufactured magnetic disk 10 of the present embodiment, the reduced magnetic spacing and the contact sliding durability are compatible with each other.

As described above, according to the present invention, there are provided a magnetic recording medium in which reduced magnetic spacing and contact sliding durability are compatible with each other, a magnetic recording medium manufacture method, and an information regeneration apparatus.

What is claimed is:

1. A medium for magnetic disk device use consisting essentially of:

a disk substrate;

a magnetic layer;

a protective layer; and a lubricant layer;

wherein the protective layer is formed only on a CSS zone or a load/unload zone, and a surface layer portion of the magnetic layer is modified by introducing at least one element from an element group consisting of nitrogen, oxygen, and fluorine.

2. A medium for magnetic disk drive use according to claim 1, wherein said protective layer comprises an amorphous carbon based material.

3. A medium for magnetic disk drive use according to claim 1, wherein said protective layer comprises a carbon film to which at least one element selected from an element group consisting of hydrogen, nitrogen, and fluoride is introduced.

4. A medium for magnetic disk drive use according to claim 1, wherein said protective layer comprises a carbon film to which hydrogen is introduced in such a manner that a C—H bond content is $15 \times 10^{21}$/cm$^3$ or less.

* * * * *